(12) United States Patent
Maljkovic et al.

(10) Patent No.: US 7,750,091 B2
(45) Date of Patent: Jul. 6, 2010

(54) POLYPHENYLENE-POLY(ARYL ETHER SULFONE) BLENDS, ARTICLES AND METHOD

(75) Inventors: Nikica Maljkovic, New Orleans, LA (US); Roy L. Carter, Chicago, IL (US); David B. Thomas, Poplarville, MS (US); Leslie J. Myrick, Poplarville, MS (US); Todd S. Rushing, Clinton, MS (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 96 days.

(21) Appl. No.: 11/850,739

(22) Filed: Sep. 6, 2007

(65) Prior Publication Data

US 2008/0293840 A1 Nov. 27, 2008

Related U.S. Application Data

(63) Continuation of application No. PCT/EP2006/060535, filed on Mar. 7, 2006.

(51) Int. Cl.
*C08L 71/12* (2006.01)

(52) U.S. Cl. .................. 525/390; 528/171; 528/125; 525/534; 525/535

(58) Field of Classification Search .............. 525/534, 525/535, 390; 528/171, 125
See application file for complete search history.

(56) References Cited

U.S. PATENT DOCUMENTS

| 3,060,856 A | 10/1962 | Dunn |
|---|---|---|
| 3,745,924 A | 7/1973 | Scanlon |
| 3,989,792 A | 11/1976 | San Miguel |
| 3,990,366 A | 11/1976 | Scanlon |
| 4,065,437 A | 12/1977 | Blinne et al. |
| 4,108,837 A | 8/1978 | Johnson et al. |
| 4,147,107 A | 4/1979 | Ringdal |
| 4,175,175 A | 11/1979 | Johnson et al. |
| 4,228,218 A | 10/1980 | Takayanagi et al. |
| 4,326,462 A | 4/1982 | Garcia et al. |
| 4,574,703 A | 3/1986 | Halverson |
| 4,614,157 A | 9/1986 | Grelle et al. |
| 4,726,296 A | 2/1988 | Leshner et al. |
| 4,839,435 A | 6/1989 | Gergen et al. |
| 5,033,386 A | 7/1991 | Vatsvog |

(Continued)

FOREIGN PATENT DOCUMENTS

DE 40 15 542 11/1991

(Continued)

OTHER PUBLICATIONS

Parodi Fabrizio, "Polysulfones", Comprehensive Polymer Science (1989), vol. 5, Chapter 33, pp. 561-591, Pergamon Press.

(Continued)

*Primary Examiner*—James Seidleck
*Assistant Examiner*—Alicia M Toscano
(74) *Attorney, Agent, or Firm*—Oblon, Spivak, McClelland, Maier & Neustadt, L.L.P.

(57) ABSTRACT

Compositions comprising blends of polyphenylene and poly(aryl ether sulfone) and methods for making such blends are disclosed. Miscible blends of polyphenylene and poly(aryl ether sulfone) are also disclosed. The blends are useful in numerous applications such as in the preparation of articles and of foams having reduced density.

1 Claim, 4 Drawing Sheets

U.S. PATENT DOCUMENTS

Figure 1:
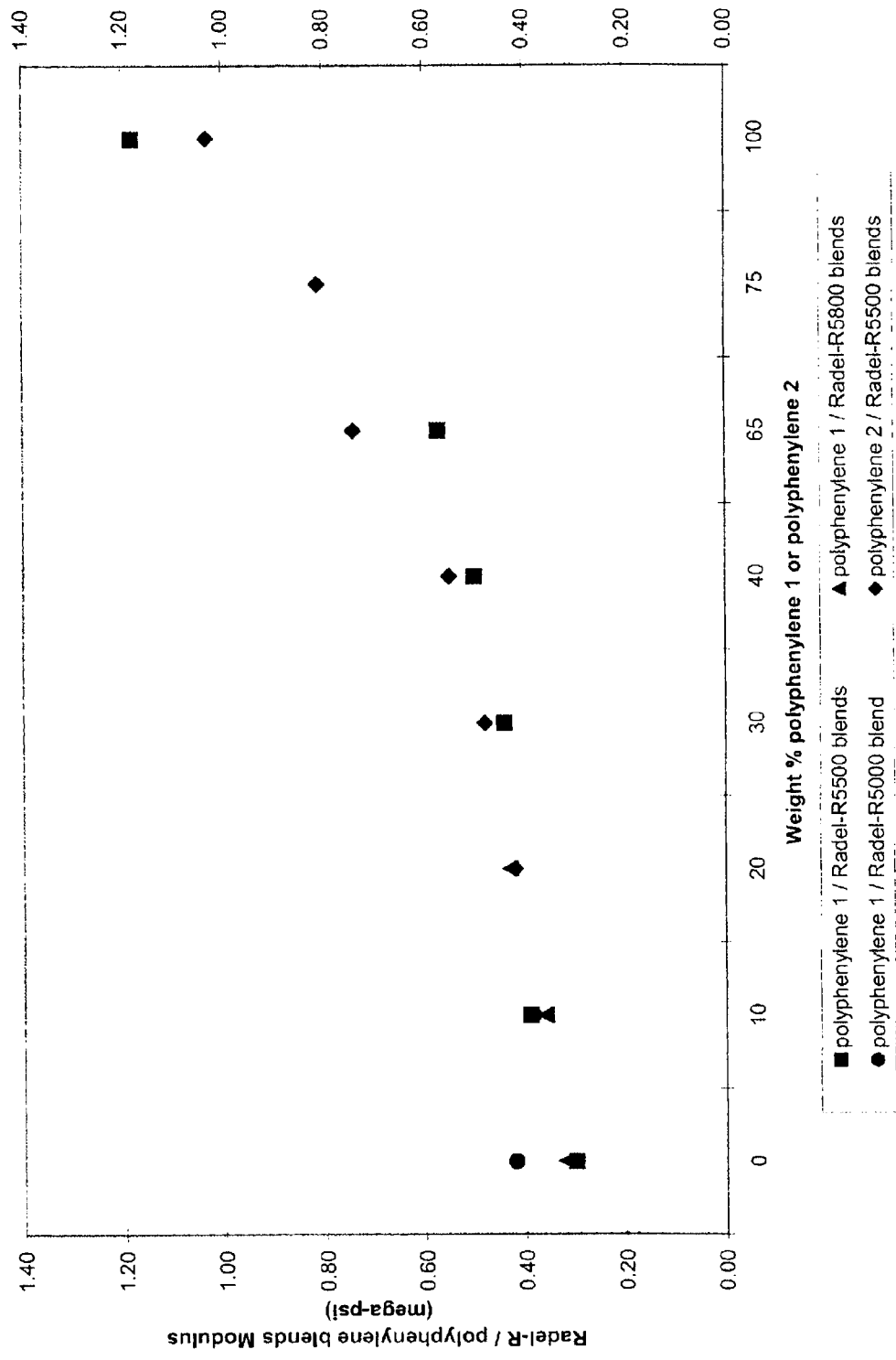
Figure 2:
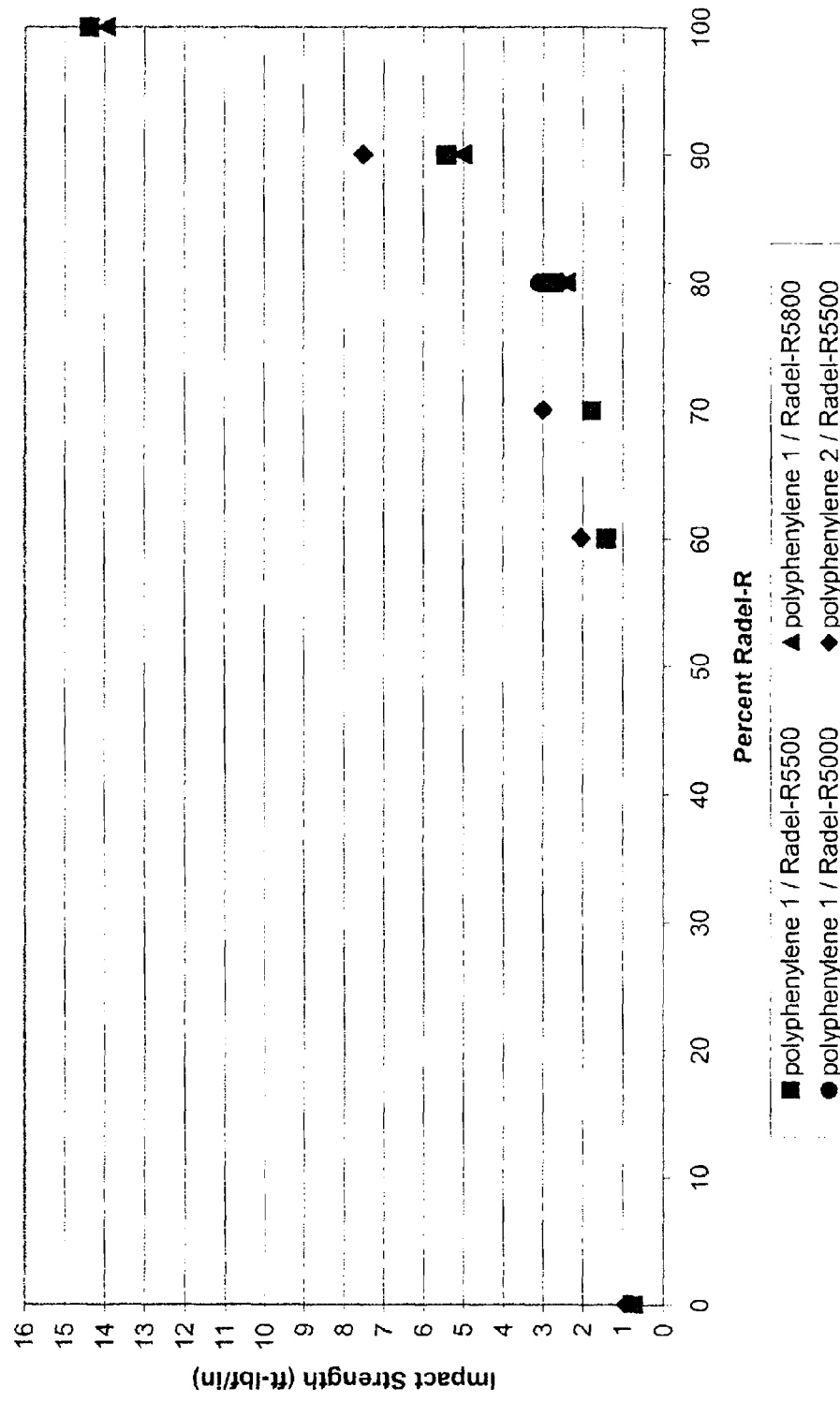
Figure 3:
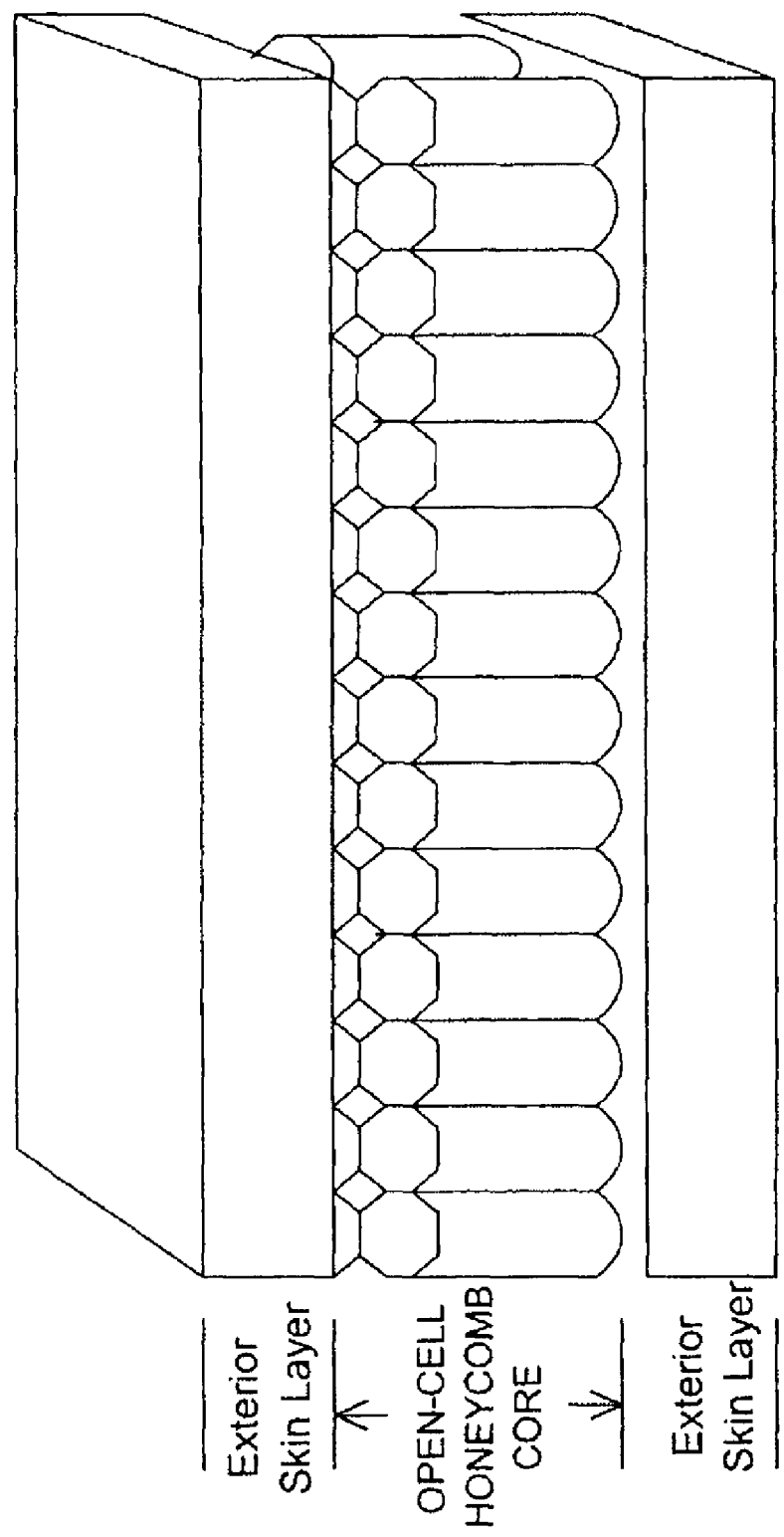
Figure 4:
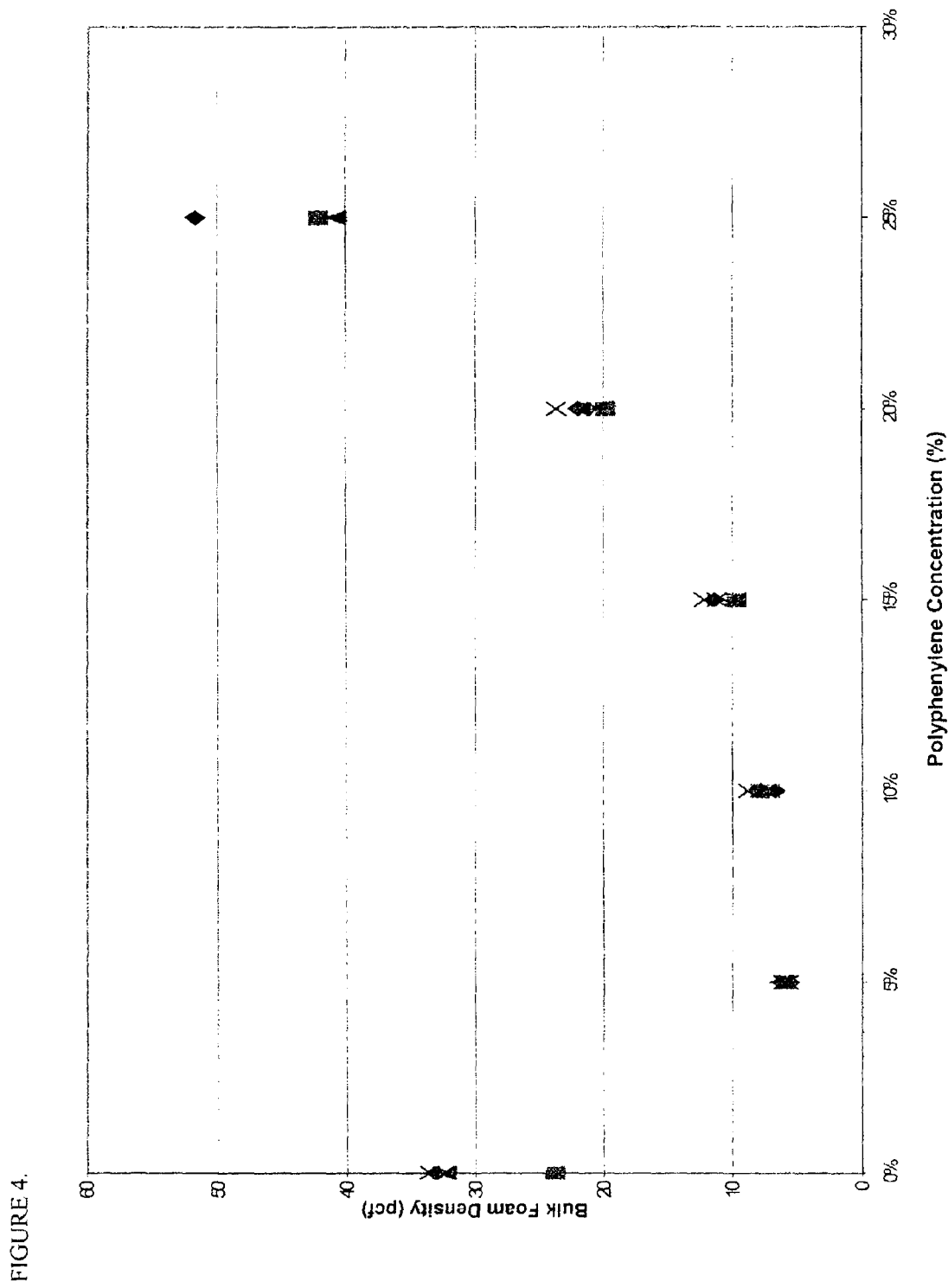

| | | |
|---|---|---|
| 5,151,555 A | 9/1992 | Vatsvog |
| 5,227,457 A | 7/1993 | Marrocco, III et al. |
| 5,259,288 A | 11/1993 | Vatsvog |
| 5,434,224 A | 7/1995 | McGrail et al. |
| 5,539,048 A | 7/1996 | Gagne et al. |
| 5,565,543 A | 10/1996 | Marrocco, III et al. |
| 5,646,231 A | 7/1997 | Marrocco, III et al. |
| 5,654,392 A | 8/1997 | Marrocco, III et al. |
| 5,659,005 A | 8/1997 | Marrocco, III et al. |
| 5,668,245 A | 9/1997 | Marrocco, III et al. |
| 5,670,564 A | 9/1997 | Gagne et al. |
| 5,721,335 A | 2/1998 | Marrocco, III et al. |
| 5,756,581 A | 5/1998 | Marrocco, III et al. |
| 5,760,131 A | 6/1998 | Marrocco, III et al. |
| 5,824,744 A | 10/1998 | Gagne et al. |
| 5,827,927 A | 10/1998 | Gagne et al. |
| 5,869,592 A | 2/1999 | Gagne et al. |
| 5,886,130 A * | 3/1999 | Trimmer et al. ............. 528/171 |
| 6,087,467 A * | 7/2000 | Marrocco et al. ........... 528/125 |
| 6,228,970 B1 * | 5/2001 | Savariar .................... 528/125 |
| 6,586,554 B1 | 7/2003 | Takahashi |
| 6,752,084 B1 | 6/2004 | Husseini et al. |
| 2001/0013299 A1 | 8/2001 | Husseini et al. |
| 2003/0181603 A1 | 9/2003 | Venderbosch et al. |
| 2006/0069236 A1 | 3/2006 | Brunelle et al. |
| 2007/0066738 A1 * | 3/2007 | Gallucci et al. ............. 524/430 |

FOREIGN PATENT DOCUMENTS

| | | |
|---|---|---|
| EP | 0 222 827 | 5/1991 |
| EP | 0 436 111 | 7/1991 |
| GB | 672706 | 5/1952 |
| GB | 732633 | 6/1955 |
| GB | 1 568 545 | 5/1980 |
| WO | WO 83/00213 | 1/1983 |
| WO | WO 86/06466 | 11/1986 |
| WO | WO 89/07496 | 8/1989 |
| WO | WO 92/07024 | 4/1992 |
| WO | WO 95/13516 | 5/1995 |

OTHER PUBLICATIONS

Encyclopedia of Polymer Science and Technology: "Plastics, Resins, Rubbers, Fibers", vol. 11, 1969.

Encyclopedia of Polymer Science and Technology: "Polysulfones," XP 002047103, vol. 13, 1985.

Standard ASTM D256, Historical 2005 Revision A, "Test Methods for Determining the Izod Pendulum Impact Resistance of Plastics", p. 1-20.

Standard ASTM D638, Historical 2003, "Test Method for Tensile Properties of Plastics", p. 1-15.

Naitove M.H., "Self-reinforcing thermoplastic is harder, stronger, stiffer without added fibers", Plastics Technology (2003), July, 2 pp., Gardner Publications Inc.

Standard ASTM D790, Historical 2003, "Test Methods for Flexural Properties of Unreinforced and Reinforced Plastics and Electrical Insulating Materials", p. 1-11.

Baldwin D., et al., "A microcellular processing study of poly(ethylene terephthalate) in the amorphous and semicrystalline states. Pat I : microcell nucleation", Polymer Engineering and Science (1996), vol. 36 (11), p. 1437-1445, Society of Plastics Engineers.

Gedde Ulf W., "Polymer-polymer blends", Polymer Physics (1999), Chapter 4.7, p. 70-73, Kluwer Academic Publishers, Dordrecht, Netherland.

Marrocco M. et al., "Poly-XTM self reinforced polymers : processible molecular composites", 39th International SAMPE Symposium and Exhibition (1994), Apr. 11-14, p. 1063-72, Society for the Advancement of Material and Process Engineering.

"Preliminary Product Data, RTP 1899A X83675 Polycarbonare/Acrylic Alloy (PC/PMMA) Thin Wall Grade," RTP Company Product Data Sheet, 5 pages, available at http://www.rtpcompany.com/info/data/1800A/RTP1899AX83675.htm, printed Mar. 7, 2005.

"Development Product Makrolon® DPI-1848, Polycarbonate Copolymer Resin General Purpose Grade," Bayer Polymers, May 2003, pp. 1-4.

"GE Plastics, Lexan® EXL9330 Americas: Commercial," General Electric Company, Last updated Sep. 29, 2004, pp. 1-5.

"Low Temperature Notched Izod Impact of RADEL R-5xxx Resins," File No. 2803, Solvay Advanced Polymers, LLC., Jan. 7, 1999, 1 page.

* cited by examiner

POLYPHENYLENE-POLY(ARYL ETHER SULFONE) BLENDS, ARTICLES AND METHOD

CROSS-RELATED APPLICATION

The present application is a continuation of PCT/EP2006/060535, filed Mar. 7, 2006.

FIELD OF THE INVENTION

The present invention relates to polyphenylene-poly(aryl ether sulfone) blends and articles made therefrom. Methods for making the blends are also disclosed.

BRIEF DESCRIPTION

In one embodiment the present invention comprises a blend composition comprising at least one polyphenylene and at least one poly(aryl ether sulfone), wherein the polyphenylene comprises a homopolymer or copolymer comprising a first repeat unit having the structure

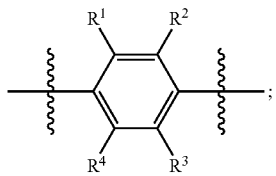

and optionally a second repeat unit having the structure

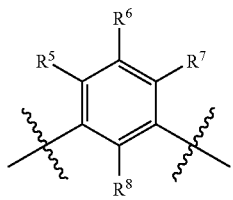

wherein $R^1$, $R^2$, $R^3$, $R^4$, $R^5$, $R^6$, $R^7$, and $R^8$ are each independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluoro, chloro, and bromo.

In another embodiment the present invention comprises a blend composition comprising at least one polyphenylene and at least one poly(aryl ether sulfone), wherein the polyphenylene comprises a homopolymer or copolymer comprising a first repeat unit having the structure

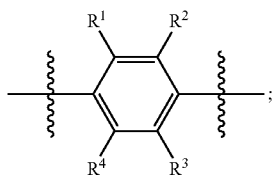

and optionally a second repeat unit having the structure

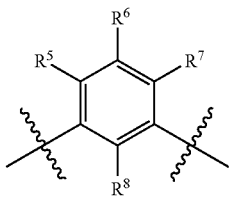

wherein $R^1$, $R^2$, $R^3$, $R^4$, $R^5$, $R^6$, $R^7$, and $R^8$ are each independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluoro, chloro, and bromo; and wherein the poly(aryl ether sulfone) comprises the repeating units $(PhSO_2Ph)_n$ linked through ether and/or thioether, wherein Ph is phenylene, and n is 1 to 3 or can be fractional.

In another embodiment the present invention comprises a blend composition comprising (a) a polyphenylene copolymer comprising structural units derived from 60-95 mole % p-dichlorobenzophenone and 40-5 mole % m-dichlorobenzene; or a polyphenylene copolymer comprising structural units derived from 30-60 mole % p-dichlorobenzophenone and 70-40 mole % m-dichlorobenzene; and (b) a poly(aryl ether sulfone) comprising structural units of the formula:

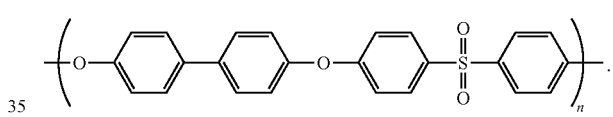

In another embodiment the present invention comprises a miscible blend comprising (a) a polyphenylene copolymer comprising structural units derived from a polyphenylene copolymer comprising structural units derived from 60-95 mole % p-dichlorobenzophenone and 40-5 mole % m-dichlorobenzene; and (b) a poly(aryl ether sulfone) comprising structural units of the formula:

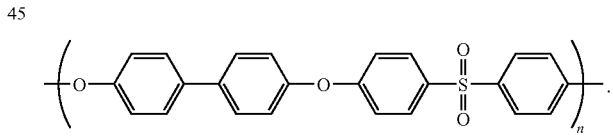

In still another embodiment the present invention comprises a miscible blend comprising (a) a polyphenylene copolymer comprising structural units derived from a polyphenylene copolymer comprising structural units derived from 30-60 mole % p-dichlorobenzophenone and 70-40 mole % m-dichlorobenzene; and (b) a poly(aryl ether sulfone) comprising structural units of the formula:

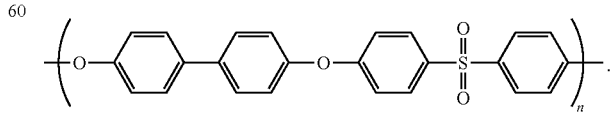

In still another embodiment the present invention comprises a foam comprising (a) a polyphenylene copolymer comprising structural units derived from 60-95 mole % p-dichlorobenzophenone and 40-5 mole % m-dichlorobenzene; or a polyphenylene copolymer comprising structural units derived from 30-60 mole % p-dichlorobenzophenone and 70-40 mole % m-dichlorobenzene; and (b) a poly(aryl ether sulfone) comprising structural units of the formula:

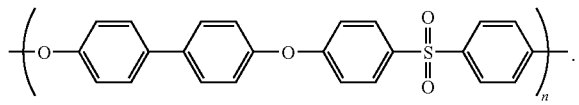

In another embodiment the present invention comprises a method for decreasing the foam density of a poly(aryl ether sulfone), which comprises the step of blending the poly(aryl ether sulfone) with at least one polyphenylene.

In still another embodiment the present invention comprises a method for making a blend composition comprising at least one polyphenylene and at least one poly(aryl ether sulfone), wherein the polyphenylene comprises a homopolymer or a copolymer comprising a first repeat unit having the structure

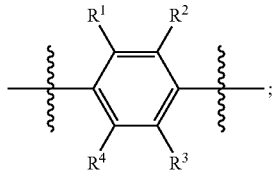

and optionally a second repeat unit having the structure

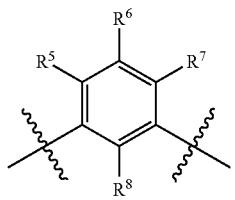

wherein $R^1$, $R^2$, $R^3$, $R^4$, $R^5$, $R^6$, $R^7$, and $R^8$ are each independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluoro, chloro, and bromo; and wherein the poly(aryl ether sulfone) comprises the repeating units $(PhSO_2Ph)_n$ and $(Ph)_k$ linked through ether and/or thioether, where Ph is phenylene, n is 1 to 3 and can be fractional, and k is 1 to 3 and can be fractional and (when k exceeds 1) such phenylenes are linked linearly through a single chemical bond or —CO—; which method comprises the steps of (a) preparing a master mixture by intimately mixing a blend comprising polyphenylene and poly(aryl ether sulfone) in a wt./wt. ratio in a range of between 10:90 and 90:10, and (b) preparing a final blend comprising less than 10 wt. % polyphenylene by diluting the master mixture with poly(aryl ether sulfone) and intimately mixing in at least one additional process step, or preparing a final blend comprising less than 10 wt. % poly(aryl ether sulfone) by diluting the master mixture with polyphenylene and intimately mixing in at least one additional process step.

In still another embodiment the present invention comprises a method for increasing the glass transition temperature (Tg) of a polyphenylene by blending with a poly(aryl ether sulfone).

In still other embodiments the invention is directed to articles made from the compositions. Various other features, aspects, and advantages of the present invention will become more apparent with reference to the following description and appended claims.

DETAILED DESCRIPTION

In the following specification and the claims which follow, reference will be made to a number of terms which shall be defined to have the following meanings. The singular forms "a", "an" and "the" include plural referents unless the context clearly dictates otherwise. The term "alkyl" as used in the various embodiments of the present invention is intended to designate linear alkyl, branched alkyl, aralkyl, cycloalkyl, bicycloalkyl, tricycloalkyl and polycycloalkyl radicals comprising carbon and hydrogen atoms, and optionally comprising atoms in addition to carbon and hydrogen, for example atoms selected from Groups 15, 16 and 17 of the Periodic Table. Alkyl groups may be saturated or unsaturated, and may comprise, for example, vinyl or allyl. The term "alkyl" also encompasses that alkyl portion of alkoxide groups. In various embodiments normal and branched alkyl radicals are those comprising from 1 to about 32 carbon atoms, and include as illustrative, non-limiting examples $C_1$-$C_{32}$ alkyl (optionally substituted with one or more groups selected from $C_1$-$C_{32}$ alkyl, $C_3$-$C_{15}$ cycloalkyl or aryl); and $C_3$-$C_{15}$ cycloalkyl optionally substituted with one or more groups selected from $C_1$-$C_{32}$ alkyl or aryl. Some illustrative, non-limiting examples include methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some particular illustrative, non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals comprise those comprising from 7 to about 14 carbon atoms; these include, but are not limited to, benzyl, phenylbutyl, phenylpropyl, and phenylethyl. The term "aryl" as used in the various embodiments of the present invention is intended to designate substituted or unsubstituted aryl radicals comprising from 6 to 20 ring carbon atoms. Some illustrative non-limiting examples of aryl radicals include $C_6$-$C_{20}$ aryl optionally substituted with one or more groups selected from $C_1$-$C_{32}$ alkyl, $C_3$-$C_{15}$ cycloalkyl, aryl, and functional groups comprising atoms selected from Groups 15, 16 and 17 of the Periodic Table. Some particular illustrative, non-limiting examples of aryl radicals include substituted or unsubstituted phenyl, biphenyl, tolyl, xylyl, naphthyl and binaphthyl. Heteroaryl groups comprise those comprising from about 3 to about 10 ring carbon atoms, and include, but are not limited to, triazinyl, pyrimidinyl, pyridinyl, furanyl, thiazolinyl and quinolinyl.

In various embodiments polyphenylenes for use in compositions of the invention comprise high modulus, rigid-rod polyphenylene polymers and copolymers. The term "high modulus" polymer or copolymer as used herein means a polymer or copolymer having a room temperature flexural modulus of at least 500,000 psi, more preferably at least 650,000 psi, and still more preferably at least 800,000 psi measured in accordance with ASTM D790. Other measures of modulus may also be used including, but not limited to, tensile modulus or shear modulus. In some particular embodiments polyphenylenes for use in compositions of the invention comprise those having any of the compositions described in U.S. Pat. Nos. 5,227,457; 5,539,048; 5,565,543; 5,646,231; 5,654,392, 5,659,005, 5,668,245; 5,670,564; 5,721,335; 5,756,581; 5,760,131; 5,824,744; 5,827,927; 5,869,592; 5,886,130; and 6,087,467, all of which are incorporated herein by reference.

Rigid-rod polyphenylenes may be derived from one or more types of phenylene monomer unit. In particular embodiments suitable polyphenylenes comprise homopolymers or copolymers comprising a first repeat unit having the structure

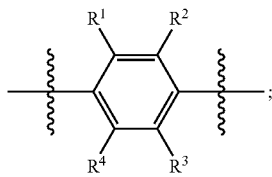

and optionally a second repeat unit having the structure

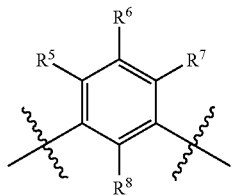

wherein $R^1$, $R^2$, $R^3$, $R^4$, $R^5$, $R^6$, $R^7$, and $R^8$ are each independently selected from the group consisting of hydrogen, alkyl, aryl, alkoxy, aryloxy, alkylketone, arylketone, fluoroalkyl, fluoroaryl, bromoalkyl, bromoaryl, chloroalkyl, chloroaryl, alkylsulfone, arylsulfone, alkylamide, arylamide, alkylester, arylester, fluoro, chloro, and bromo. In some particular embodiments $R^1$ is phenylketone and $R^2$, $R^3$, and $R^4$ are hydrogen. In other particular embodiments wherein, the second repeat unit is present, $R^1$ is phenylketone and $R^2$, $R^3$, $R^4$, $R^5$, $R^6$, $R^7$, and $R^8$ are hydrogen. In particular embodiments, suitable polyphenylenes comprise copolymers comprising the first and second repeat units in any proportions. In other particular embodiments, wherein the second repeat unit is present, the mole fraction of the first repeat units is in a range of between about 0.1% and about 85%. In still other particular embodiments, wherein the second repeat unit is present, the mole fraction of the first repeat units is in a range of between about 1% and about 85%. In still other particular embodiments, wherein the second repeat unit is present, the mole fraction of the second repeat units is in a range of between about 15% and about 99%; or preferably in a range of between about 25% and about 65%. In still other particular embodiments the number average degree of polymerization ($DP_n$) of the rigid-rod polyphenylene polymer or copolymer is greater than about 6, preferably greater than about 8, more preferably greater than about 10, still more preferably greater than about 12, still more preferably greater than about 16, still more preferably greater than about 20, and still more preferably greater than about 25. As used herein, $DP_n$ is defined as follows:

$DP_n$=(number of monomer molecules present initially)/(number of polymer chains in the system).

In some particular embodiments suitable polyphenylenes comprise a rigid-rod polyphenylene copolymer comprising structural units derived from p-dichlorobenzophenone and optionally m-dichlorobenzene. In the present specification and accompanying claims, the term p-dichlorobenzophenone refers to 2,5-dichlorobenzophenone. In still another particular embodiment a suitable polyphenylene comprises a rigid-rod polyphenylene copolymer comprising structural units derived from 20-99 mole % p-dichlorobenzophenone and 1-80 mole % m-dichlorobenzene. In still other particular embodiments a suitable polyphenylene comprises a rigid-rod polyphenylene copolymer comprising structural units derived from 80-90 mole % p-dichlorobenzophenone and 20-10 mole % m-dichlorobenzene. In still other particular embodiments a suitable polyphenylene comprises a rigid-rod polyphenylene copolymer comprising structural units derived from 45-55 mole % p-dichlorobenzophenone and 55-45 mole % m-dichlorobenzene.

In other particular embodiments suitable polyphenylenes comprise at least one of a rigid-rod polyphenylene copolymer (a) comprising structural units derived from (a) p-dichlorobenzophenone, or (b) comprising structural units derived from 60-95 mole % p-dichlorobenzophenone and 40-5 mole % m-dichlorobenzene; or (c) comprising structural units derived from 30-60 mole % p-dichlorobenzophenone and 70-40 mole % m-dichlorobenzene. Mixtures of two or more polyphenylenes are also within the scope of the invention. In still other particular embodiments suitable polyphenylenes comprise a mixture of a rigid-rod polyphenylene copolymer comprising structural units derived from 60-95 mole % p-dichlorobenzophenone and 40-5 mole % m-dichlorobenzene; and a rigid-rod polyphenylene copolymer comprising structural units derived from 30-60 mole % p-dichlorobenzophenone and 70-40 mole % m-dichlorobenzene. In still other particular embodiments suitable polyphenylenes comprise rigid-rod polyphenylene polymers and copolymers available from Mississippi Polymer Technologies, Bay St. Louis, Miss., under the tradename PARMAX®.

The poly(aryl ether sulfone)

For the purpose of the invention, a poly(aryl ether sulfone) is intended to denote any polymer of which at least 5 wt. % of the recurring units are recurring units (R) of one or more formulae comprising at least one arylene group, at least one ether group (—O—) and at least one sulfone group [—S(=O)$_2$—].

The poly(aryl ether sulfone) is usually obtainable by a polycondensation reaction. Preferably, it is effectively obtained by such a reaction; the case being, it may be notably synthesized by polycondensing at least one dihalodiphenyl sulfone with at least one diol.

The poly(aryl ether sulfone) is usually amorphous, and it has usually a glass transition temperature. Preferably, the poly(aryl ether sulfone) has a glass transition temperature of at least 150° C., preferably at least 160° C., and more preferably at least 175° C.

The glass transition temperature of the poly(aryl ether sulfone) can be measured by any suitable technique known from the skilled in the art; very often, they are measured by Differential Scanning Calorimetry. For example, a Universal V3.7A Instruments DSC calorimeter can be used to measure the glass transition temperature of the poly(aryl ether sulfone). For this purpose, it is preliminarily checked that the calorimeter was well-calibrated by means of a calibration sample. Then, the poly(aryl ether sulfone) is submitted to the following heating/cooling cycle: $1^{st}$ heating from room temperature up to 350° C. at a rate of 10° C./min, followed by cooling from 350° C. down to room temperature at a rate of 20° C./min, followed by $2^{nd}$ heating from room temperature up to 350° C.

at a rate of 110° C./min. The glass transition temperature is measured during $2^{nd}$ heating. The glass transition temperature is advantageously determined by a construction procedure on the heat flow curve: a first tangent line to the curve above the transition region is constructed; a second tangent line to the curve below the transition region is also constructed; the temperature on the curve halfway between the two tangent lines, or ½ delta Cp, is the glass transition temperature.

The poly(aryl ether sulfone) comprises preferably above 25 wt. %, more preferably above 50 wt. %, still more preferably above 90 wt. %, and even more preferably above 95 wt. % of recurring units (R). Most preferably, the poly(aryl ether sulfone) contains recurring units (R) as sole recurring units.

In various embodiments poly(aryl ether sulfone)s for use in compositions in embodiments of the invention comprise the repeating units $(PhSO_2Ph)_n$ linked through ether and/or thioether, where n is 1 to 3 or can be fractional in this range. In many embodiments suitable poly(aryl ether sulfone)s preferably further comprise the structural units $(Ph)_k$ so linked, wherein Ph is phenylene (especially para-phenylene), "k" is 1 to 3 or can be fractional within this range, and such phenylenes are linked linearly through a single chemical bond or a divalent group other than $SO_2$, such as, but not limited to —CO—, or are fused together. By "fractional" reference is made to the average value for a given polymer chain containing units having various values of "n" or "k". In some embodiments the poly(aryl ether sulfone) has a Tg of greater than about 175° C. In a particular embodiment the poly(aryl ether sulfone) has a Tg in a range of between about 200° C. and about 225° C., and in another particular embodiment the poly(aryl ether sulfone) has a Tg in a range of between about 255° C. and 275° C.

In some embodiments poly(aryl ether sulfone)s have relative proportions of $(PhSO_2Ph)_n$ and $(Ph)_k$ repeating units such that on average at least two units $(PhSO_2Ph)_n$ are in immediate mutual succession in each polymer chain present and the two units are preferably present in the range of 1:99 to 99:1, especially 10:90 to 90:10. Typically the ratio is in the range 25-50 $(Ph)_k$, balance $(PhSO_2Ph)_n$. In some particular examples of poly(aryl ether sulfone)s the structural units may comprise (I) —X-Ph-$SO_2$-Ph-X-Ph-$SO_2$-Ph-; or (II) —X-$(Ph)_k$-X-Ph-$SO_2$-Ph-; or mixtures thereof, where X is O or S and may differ from unit to unit; and, when both (I) and (II) are present, the ratio of I to II, is preferably between 10:90 and 80:20 especially between 10:90 and 55:45.

In other particular embodiments the preferred relative proportions of the repeating units of the poly(aryl ether sulfone) may be expressed in terms of the weight percent $SO_2$ content, defined as 100 times (weight of $SO_2$)/(weight of average repeat unit). The preferred $SO_2$ content is at least 12%, preferably in a range of 13% to 32%.

The above proportions refer only to the units mentioned. In addition to such units the poly(aryl ether sulfone) may contain up to 50 mole % especially up to 25 mole % of other repeating units: the preferred $SO_2$ content ranges (if used) then apply to the whole polymer. Such units may be for example of the formula (III) in which A is a direct link, oxygen, sulfur, —CO— or a divalent hydrocarbon radical.

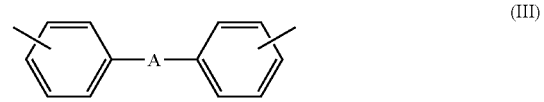

When the poly(aryl ether sulfone) is the product of nucleophilic synthesis, its units may have been derived for example from one or more the following bisphenols and/or corresponding bis-thiols or phenol-thiols: hydroquinone; 4,4'-dihydroxybiphenyl; resorcinol; dihydroxynaphthalene (2,6 and other isomers); 4,4'-dihydroxydiphenyl ether or -thioether; 4,4'-dihydroxybenzophenone; or 2,2'-di-(4-hydroxyphenyl)-propane or -methane. If a bis-thiol is used, it may be formed in situ, that is, a dihalide as described for example below may be reacted with an alkali sulfide or polysulfide or thiosulfate.

Other examples of such additional units are of the formula (IV) in which Q and Q', which may be the same or different, are CO or $SO_2$; Ar is a divalent aromatic radical; and n is 0, 1, 2, or 3, provided that n is not zero where Q is $SO_2$.

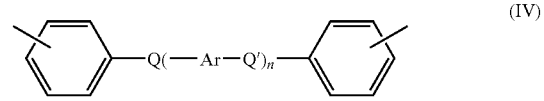

The moiety is Ar is preferably at least one divalent aromatic radical selected from phenylene, biphenylene or terphenylene. Particular units have the formula (V) where m is 1, 2 or 3.

When the polymer is the product of nucleophilic synthesis, such units may have been derived from one or more dihalides, for example: 4,4'-dihalobenzophenone; 4,4' bis-(4-chlorophenylsulfonyl)biphenyl; 1,4bis-(4-halobenzoyl) benzene; or 4,4'-bis-(4-halobenzoyl)biphenyl. They may of course have been derived partly from the corresponding bisphenols.

The poly(aryl ether sulfone) may be the product of nucleophilic synthesis from halophenols and/or halothiophenols. In any nucleophilic synthesis the halogen, if chlorine or bromine, may be activated by the presence of a copper catalyst. Such activation is often unnecessary if the halogen is activated by an electron withdrawing group. In any event fluoride is usually more active than chloride. Any nucleophilic synthesis of the poly(aryl ether sulfone) is carried out preferably in presence of one or more alkali metal carbonates in up to about 10 mole % excess over the stoichiometric amount and of an aromatic sulfone solvent, at a temperature in the range 150° C. to 350° C. If desired, the poly(aryl ether sulfone) may be the product of electrophilic synthesis.

In some embodiments the number average molecular weight of the poly(aryl ether sulfone) is in the range of about 2000 to about 60000. Preferably it is over 9000, especially over 10000, for example in a range of between about 9000 and about 35000, and preferably in a range of between about 11000 and about 35000. Another useful sub-range is 3000-11000, especially 3000-9000.

Further illustrative examples of suitable poly(aryl ether sulfone)s and methods to prepare them comprise those as described in U.S. Pat. Nos. 4,065,437; 4,108,837; 4,175,175; 4,839,435; 5,434,224; and 6,228,970 which are incorporated herein by reference. Still further illustrative examples of suitable poly(aryl ether sulfone)s and methods to prepare them comprise those as described in "Polysulfones" by Fabrizio Parodi in "Comprehensive Polymer Science", vol. 5, pp. 561-591, Pergamon Press, 1989 which is incorporated herein by reference. Some particular examples of suitable poly(aryl ether sulfone)s comprise polyphenylsulfones which comprise structural units of the formula (VI):

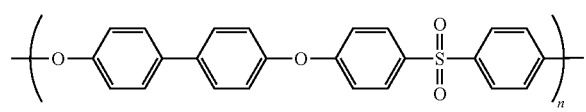
(VI)

Still other examples of poly(aryl ether sulfone)s suitable for the purpose of the present invention are described in embodiments (E1) to (E4) below.

Embodiment (E1)

In a certain embodiment (E1) of the present invention, the poly(aryl ether sulfone) is a poly(biphenyl ether sulfone).

For the purpose of the present invention, a poly(biphenyl ether sulfone) is intended to denote a polymer of which more than 50 wt. % of the recurring units are recurring units (R1) of one or more formulae containing at least one p-iphenylene group:

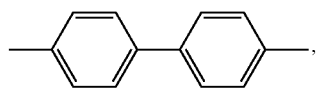

at least one ether group (—O—) and at least one sulfone group [—S(=O)$_2$—].

Recurring units (R1) are preferably of one or more formulae of the general type:

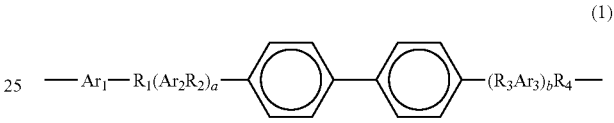
(1)

wherein $R_1$ through $R_4$ are —O—, —SO$_2$—, —S—, —CO—, with the proviso that at least one of $R_1$ through $R_4$ is —SO$_2$— and at least one of $R_1$ through $R_4$ is —O—; $Ar_1$, $Ar_2$ and $Ar_3$ are arylene groups containing 6 to 24 carbon atoms, and are preferably phenylene or p-biphenylene; and a and b are either 0 or 1.

More preferably, recurring units (R1) are chosen from

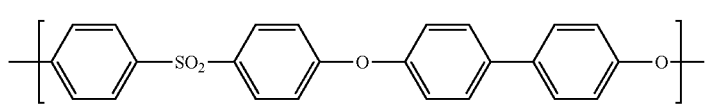
(2)

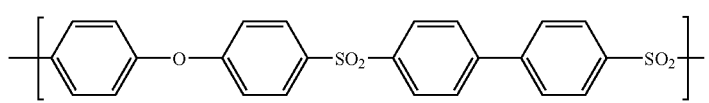
(3)

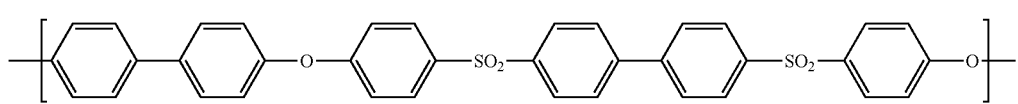
(4)

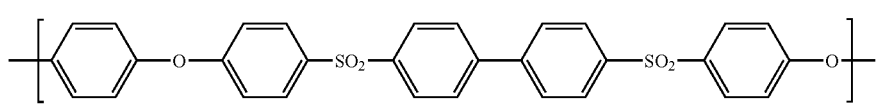
(5)

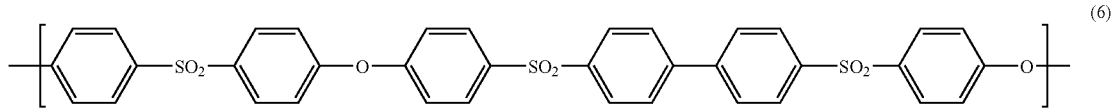
(6)

and mixtures thereof.

Still more preferably, recurring units (R1) are chosen from

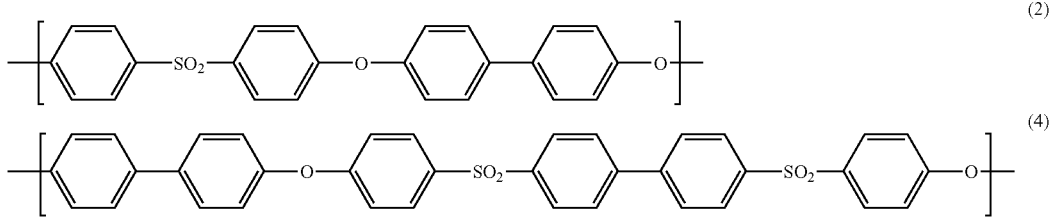

and mixtures thereof.

For the purpose of the present invention, a PPSU polymer is intended to denote any polymer of which more than 50 wt. % of the recurring units are recurring units (R1) of formula (2).

The poly(biphenyl ether sulfone) may be notably a homopolymer or a copolymer such as a random or block copolymer. When the poly(biphenyl ether sulfone) is a copolymer, its recurring units may notably be composed of (i) recurring units (R1) of at least two different formulae chosen from formulae (2) to (6), or (ii) recurring units (R1) of one or more formulae (2) to (6) and recurring units (R1*), different from recurring units (R1), such as

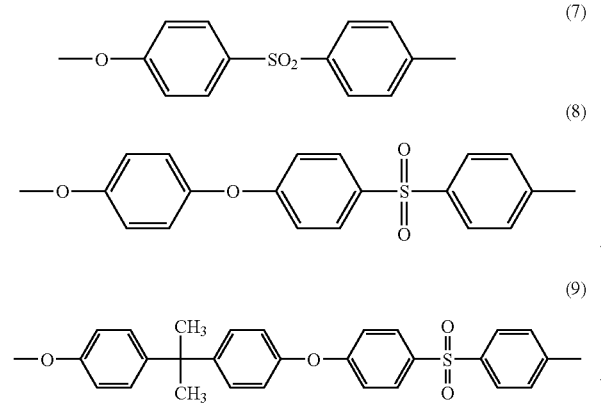

and mixtures thereof.

Preferably more than 90 wt. %, and more preferably more than 95 wt. % of the recurring units of the poly(biphenyl ether sulfone) are recurring units (R1). Still more preferably, all the recurring units of the poly(biphenyl ether sulfone) are recurring units (R1).

Excellent results were obtained when the poly(biphenyl ether sulfone) was a PPSU homopolymer, i.e. a polymer of which all the recurring units are of formula (2). RADEL® R polyphenylsulfone from SOLVAY ADVANCED POLYMERS, L.L.C. is an example of a PPSU homopolymer.

The poly(biphenyl ether sulfone) can be prepared by any method. Methods well known in the art are those described in U.S. Pat. Nos. 3,634,355; 4,008,203; 4,108,837 and 4,175,175, the whole content of which is herein incorporated by reference.

Embodiment (E2)

In a certain embodiment (E2) of the present invention, the poly(aryl ether sulfone) is a polysulfone.

To the purpose of the present invention, a polysulfone is intended to denote any polymer of which more than 50 wt. % of the recurring units are recurring units (R2) of one or more formulae containing at least one ether group (—O—), at least one sulfone group (—SO$_2$—) et at least one group as shown hereafter:

Preferably, recurring units (R2) are chosen from

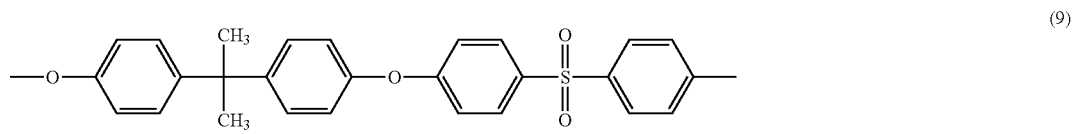

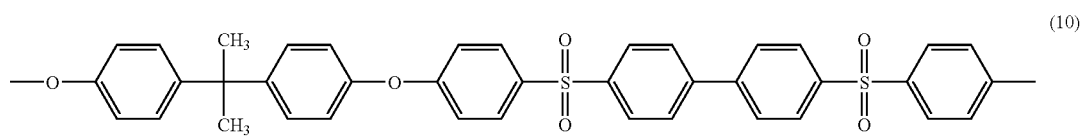

and mixtures thereof.

Very preferably, recurring units (R2) are

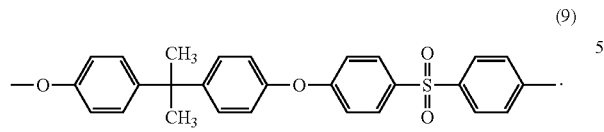
(9)

The polysulfone may notably be a homopolymer, a copolymer such as a random or block copolymer. When the polysulfone is a copolymer, its recurring units may notably be composed of (i) recurring units (R2) of formulas (9) and (10), or (ii) on one hand, recurring units (R2) of at least one of formulas (9) and (10), and, on the other hand, recurring units (R2*), different from recurring units (R2), such as:

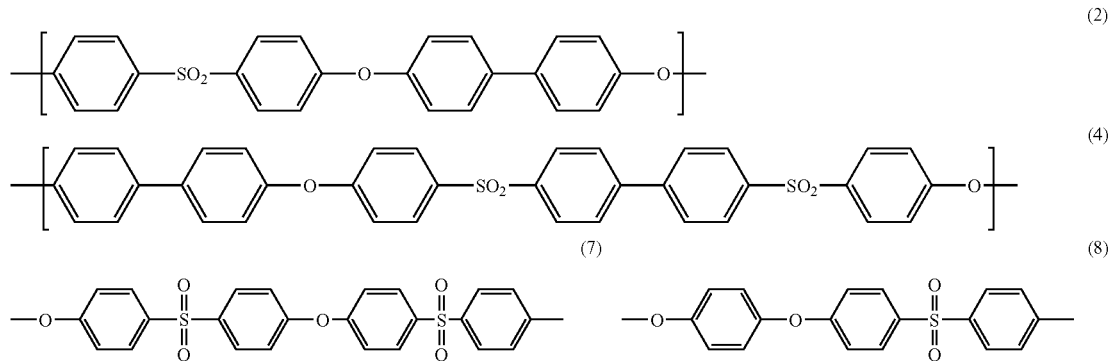

and mixtures thereof.

Preferably more than 90 wt. %, and more preferably more than 95 wt. % of the recurring units of the polysulfone are recurring units (R2). Still more preferably, all the recurring units of the polysulfone are recurring units (R2).

The most preferred polysulfone is a homopolymer of which the recurring units are recurring units (R2) of formula

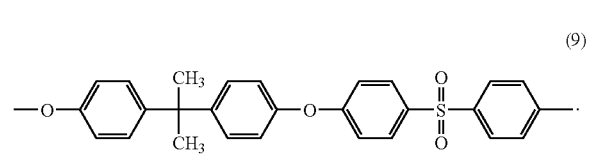
(9)

Such a polysulfone homopolymer is notably commercialized by SOLVAY ADVANCED POLYMERS, L.L.C. under the trademark UDEL®.

Embodiment (E3)

In a certain embodiment (E3) of the present invention, the poly(aryl ether sulfone) is a polyethersulfone.

To the purpose of the present invention, a polyethersulfone is intended to denote any polymer of which more than 50 wt. % of the recurring units are recurring units (R3) of formula (7)

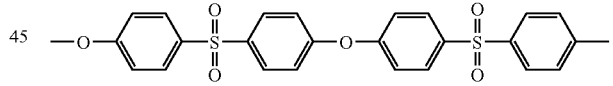

The polyethersulfone may be notably a homopolymer, or a copolymer such as a random or a block copolymer. When the polyethersulfone is a copolymer, its recurring units are advantageously a mix of recurring units (R3) of formula (7) and of recurring units (R3*), different from recurring units (R3), such as:

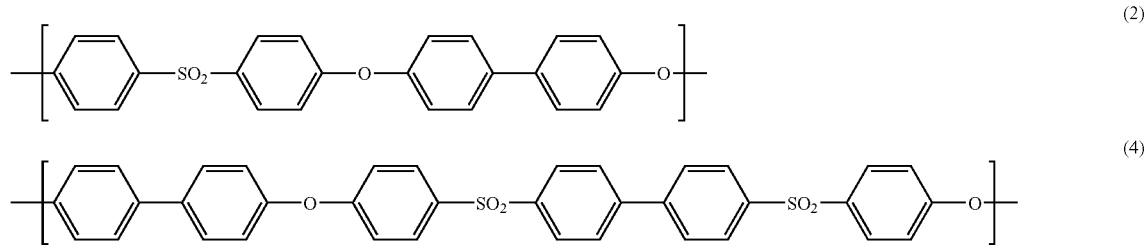

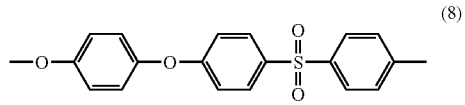 (8)

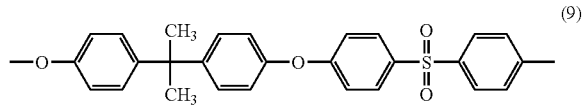 (9)

and mixtures thereof.

Preferably, the polyethersulfone is a homopolymer, or it is a copolymer the recurring units of which are a mix composed of recurring units (R3) of formula (7) and of recurring units (R3*) of formula (8), or it can also be a mix of the previously cited homopolymer and copolymer.

SOLVAY ADVANCED POLYMERS, L.L.C. commercializes various polyethersulfones under the trademark RADEL® A.

Embodiment (E4)

In a certain embodiment (E4) of the present invention, the poly(aryl ether sulfone) is a polyimidoethersulfone.

For the purpose of the present invention, a polyimidoethersulfone is intended to denote a polymer of which at least 5 wt. % of the recurring units are recurring units (R4) of formula (11a), (11b) and/or (11c), as represented below wherein:
(11b) and (11c) are the amic acid forms corresponding to the imide form (11a);
the → denotes isomerism so that in any recurring unit the groups to which the arrows point may exist as shown or in an interchanged position;
Ar" is chosen among the following structures:

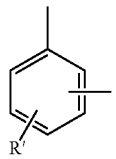

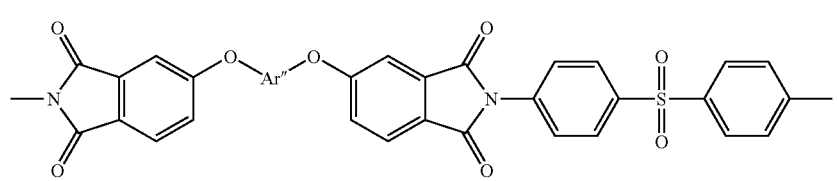 (11a)

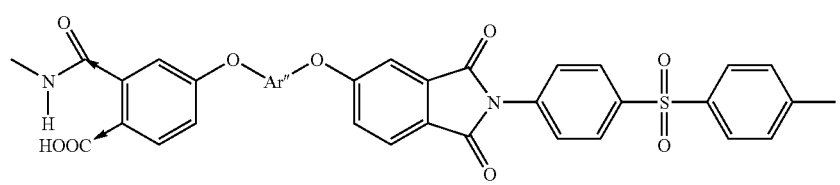 (11b)

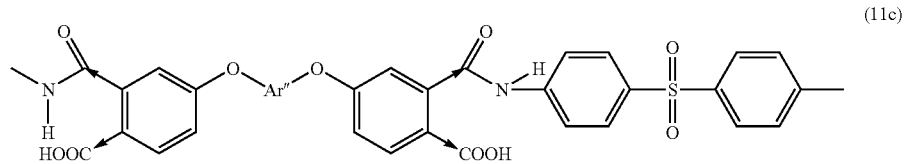 (11c)

with the linking groups being in ortho, meta or para position and R' being a hydrogen atom or an alkyl radical comprising from 1 to 6 carbon atoms,

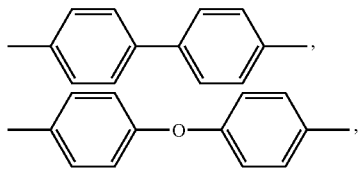

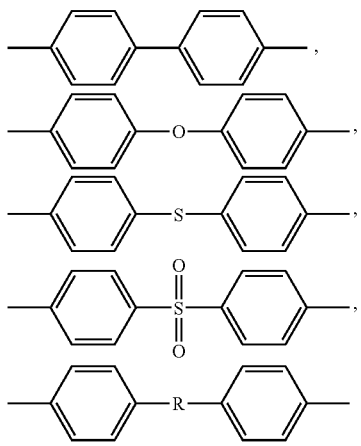

with R being an aliphatic divalent group of up to 6 carbon atoms, such as methylene, ethylene, isopropylene and the like, and mixtures thereof.

Preferably more than 50 wt. %, and more preferably more than 90 wt. % of the recurring units of the polyimidoethersulfone are recurring units (R4). Still more preferably, all the recurring units of the polyimidoethersulfone are recurring units (R4).

This closes the discussion on embodiments (E1) to (E4).

Depending upon the desired application of the blend, the relative weight amount of polyphenylene (i.e. the weight amount of polyphenylene divided by the weight amount of polyphenylene and poly(aryl ether sulfone)) may be notably above about 0.1%; or above about 0.5%; or above about 1%; or above about 2%; or above about 4%; or above about 5%; or above about 10%; or above about 15%; or above about 20%; or above about 25%; or above about 30%; or above about 35%; or above about 40%; or above about 45%.

Depending upon the desired application of the blend, the relative weight amount of polyphenylene (i.e. the weight amount of polyphenylene divided by the weight amount of polyphenylene and poly(aryl ether sulfone)) may be notably below about 99.9%; or below about 99.5%; or below about 99%; or below about 98%; or below about 96%; or below about 95%; or below about 90%; or below about 85%; or below about 80%; or below about 75%; or below about 70%; or below about 65%; or below about 60%; or below about 55%.

Depending upon the desired application of the blend, the polyphenylene and poly(aryl ether sulfone) may be notably in a wt./wt. ratio range of between about 0.1:99.9 to 99.9:0.1; or in a wt./wt. ratio range of between about 0.5:99.5 to 99.5:0.5; or in a wt./wt. ratio range of between about 1:99 to 99:1; or in a wt./wt. ratio range of between about 2:98 to 98:2; or in a wt./wt. ratio range of between about 4:96 to 96:4; or in a wt./wt. ratio range of between about 5:95 to 95:5; or in a wt./wt. ratio range of between about 10:90 to 90:10; or in a wt./wt. ratio range of between about 15:85 to 85:15; or in a wt./wt. ratio range of between about 20:80 to 80:20; or in a wt./wt. ratio range of between about 25:75 to 75:25; or in a wt./wt. ratio range of between about 30:70 to 70:30; or in a wt./wt. ratio range of between about 35:65 to 65:35; or in a wt./wt. ratio range of between about 40:60 to 60:40; or in a wt./wt. ratio range of between about 45:55 to 55:45. Within these ranges, a preferred range of the amounts of polyphenylene and poly(aryl ether sulfone) may be in a range of wt./wt. ratios of 0.1:99.9 and 70:30.

Additives may be included in the polyphenylene-poly(aryl ether sulfone) blend compositions of the invention. Nonlimiting examples of additives comprise adhesion promoters, antioxidants, antistatic agents, carbon black, carbon fibers, compatibilizers, curing agents, dyes, extending fillers, fire retardants, glass fibers, lubricants, metal particles, mold release agents, pigments, plasticizers, reinforcing fillers, rubbers, silica, smoke retardants, tougheners, UV absorbers, or the like, or mixtures thereof.

Depending upon the desired application of the blend, the weight amount of the polyphenylene and of the poly(aryl ether sulfone), based on the total weight of the blend composition (i.e. polyphenylene+poly(aryl ether sulfone)+additives), may be notably below about 99%; or below about 95%; or below about 90%; or below about 80%; or below about 60%.

Depending upon the desired application of the blend, the weight amount of the polyphenylene and of the poly(aryl ether sulfone), based on the total weight of the blend composition (i.e. polyphenylene+poly(aryl ether sulfone)+additives), may be notably above about 1%; or above about 2%; or above about 5%; or above about 10%; or above about 20%; or above about 40%; or above about 60%; or above about 80%; or above about 90%; or above about 95%; or above about 99%; it can also be of about 100%, i.e. the blend composition is essentially composed of the polyphenylene and the poly (aryl ether sulfone); it can even be of 100%, i.e. the blend composition is composed of the polyphenylene and the poly (aryl ether sulfone).

In some embodiments blends of the present invention may be fabricated into fibers, such as is described for soluble polyphenylenes in U.S. Pat. No. 5,756,581, which is incorporated herein by reference. In other embodiments blends of the present invention may be fabricated into film. Many different methods may be used to form films. Either continuous or batch processes may be used. Films may be extruded from the melt through a slit. Films may also be formed by blow extrusion. Films may also be further processed by stretching and/or annealing. Special films such as bilayers, laminates, porous films, textured films and the like may be produced by techniques known in the art.

Films comprising the blends of the invention may be oriented by stretching. Stretching along one dimension will result in uniaxial orientation. Stretching in two dimensions will give biaxial orientation. Stretching may be aided by heating near the glass transition temperature. Stretching may also be aided by plasticizers. More complex processes such as applying alternating cycles of stretching and annealing may also be used with the blends of the present invention.

In other embodiments blends of the present invention may be fabricated into membranes useful for separations of mixed gases, liquids and solids. Membranes may be produced by known methods. Filters may be prepared by weaving fibers prepared from the blends, or forming non-woven mats from chopped fibers, and like methods.

In other embodiments coatings comprising blends of the invention may be formed by known techniques, including but not limited to, powder coating, laminating preformed films, coating from the melt, and like methods.

Various molding techniques may be used to form articles from the blends of the present invention. Powders, pellets, beads, flakes, reground material or other forms of the blend compositions may be molded, with or without liquid or other additives, premixed or fed separately. In particular embodiments the blends may be compression molded. Exact conditions may be determined by trial and error molding of small samples. Upper temperature limits may be estimated from thermal analysis such as thermogravimetric analysis. Lower temperature limits may be estimated from Tg as measured for example by dynamic mechanical thermal analysis (DMTA), differential scanning calorimetry (DSC), or like methods.

Some of the blends provided in embodiments of the present invention may also be injection molded. To determine if a particular blend can be injection molded, the melt viscosity may be measured under shear, typically using a capillary melt flow rheometer, or like method. Typically blends having melt viscosities of less than about 20,000 poises at shear rates greater than $10^3$ sec$^{-1}$ can be injection molded. It is also desirable if the blend can be remelted several times without degradation, so that regrind from molding processes can be used. One skilled in the art will recognize that other factors also influence injection moldability including the material's stress relaxation properties and the temperature dependence of melt viscosity. The utility of injection molding for any of the blends of the present invention may readily be determined by one skilled in the art.

In other embodiments forms of blends of the invention may be produced by extrusion. Non-limiting examples include angle, channel, hexagonal bar, hollow bar, I-beam, joining strip, tubes, rectangular tube, rod, sheet, plate, square bar, square tube, T-section, thin-walled tubes, microtubes, strands, rectangular strands, or other shapes as is required for a particular application. Related to extrusion is pultrusion, wherein a fiber reinforcement is continuously added to an extruded polymer or blend. In still other embodiments the blends of the present invention may be used as a thermoplastic matrix which is pultruded with fibers, such as carbon fiber or glass fiber. Alternatively, the blends of the present invention may be used as the fiber for pultrusion of a thermoplastic having a lower processing temperature. In the first case, composites with exceptional moduli and compressive strength will result. In the second case, lower cost thermoplastics having moderate moduli and strength can be formed into composites with high moduli and strength by the incorporation of the blend fibers. Such a composite is unique in that the reinforcing fibers are themselves thermoplastic and further processing at temperatures above the fiber Tg will result in novel structures as the fibers physically and/or chemically mix with the matrix.

Many of the forms of the blends in embodiments alluded to above may be further processed and combined with other material to yield articles of higher value. Sheet stock may be cut, stamped, welded, or thermally formed. For example, printed wiring boards may be fabricated from sheet or thick films by a process wherein copper is deposited on to one or both sides, patterned by standard photolithographic methods, etched, then holes are drilled, and several such sheets laminated together to form a finished board. Such boards are novel in that they do not contain any fiber reinforcement. Such reinforcement is not necessary because of the unusually high modulus of the instant blends. Such boards are also unique in that they may be bent into non-planar structures, by application of heat and pressure, to better fit limited volume enclosures, such as laptop computers. Sheet and film may also be thermoformed into any variety of housings, cabinets, containers, covers, chassis, plates, panels, fenders, hoods, and the like.

In other embodiments blends of the invention may form the dielectric layers of multichip modules. Multichip modules (MCM) are similar to printed wiring boards except that integrated circuits are mounted directly on the MCM without prior packaging. The integrated circuits may be more closely packed, saving total system volume, reducing propagation delays, and increasing maximum operating frequency, among other benefits. Such MCM structures may be fabricated by many diverse processes. Many of the currently practiced methods of MCM fabrication may be applied.

In other embodiments blends of the present invention may be combined with a variety of other polymers, additives, fillers, and the like, collectively called additives, before processing by any of the above or other methods. For example, the blends of the present invention may be blended with some amount of a more flexible polymer to improve the extension-to-break of the blend. Thus, finished products formed from such a blend, e.g., film, sheet, rod or complex molded articles will be relatively tougher. In particular embodiments rubbers may be added to toughen the finished product. A liquid crystalline polymer may be added to reduce melt viscosity. Many other combinations will be apparent to those skilled in the art. The particular amounts of each additive will depend on the application but may cover the range from none to large amounts.

Polyphenylene-poly(aryl ether sulfone) blends of the present invention can also be used in structural applications. Because of their high intrinsic stiffness, parts fabricated with the blends may have mechanical properties approaching or equal to fiber containing composites. In many applications where fibers are necessary for structural reasons they cause other undesirable effects. For example, radomes for airborne radar are typically constructed of glass fiber reinforced composites, but the glass fibers lead to signal loss and degradation of radar performance. Fiberless radomes comprised of blends of the invention may improve radar performance over composite radomes. Fiberless radomes would also be easier to fabricate than composite radomes. Fiberless radomes comprising blends of the invention could be injection or compression molded or stamped from sheet, or machined from stock.

In other embodiments blends of the invention can be used to advantage in fiber containing composites as the matrix resin. As is known in the art the compressive strength of composites is related to the modulus of the matrix resin. Resins with high moduli will give composites with high compressive strength. The blends of the present invention can be used to form composites by established techniques. Additives may be used as is known in the art including mold releases, antioxidants, curing agents, particulates, tougheners and the like.

In other embodiments rigid-rod polyphenylenes can be used as flame retardants, enhanced char-formation additives, and/or smoke retardants in blends with poly(aryl ether sulfone)s. In particular embodiments rigid-rod polyphenylenes can be used as heat and smoke release stabilizers in blends with poly(aryl ether sulfone)s used in aircraft interior applications. Examples of specific applications include, but are not limited to, molded parts for aircraft window reveals, air ducts, seating and flight deck components, galleys, stow bins and sidewalls.

Poly(aryl ether sulfone)s, such as RADEL® R polyphenylsulfone, are used extensively in aerospace applications, but only marginally qualify in terms of their heat and visible smoke release ratings. Currently RADEL® R7535 and 7558 polyphenylsulfones, which are used for molded aircraft interior parts, have OSU (Ohio State University) heat release rates of 20 kW/m$^2$ at two minutes and 55 kW/m$^2$ at peak heat release rates. In contrast, qualitative heat and smoke release observations for neat rigid-rod polyphenylene resin show that it has extraordinarily low heat and smoke release rates.

In another embodiment the present invention describes a method for improving the heat and smoke release ratings of poly(aryl ether sulfone)s by blending with a high performance, inherently flame-retardant, nonsmoking, low heat releasing polyphenylene resin. The use of rigid-rod polyphenylene resins as additives simultaneously improves heat and smoke release, flammability, and physical properties of the poly(aryl ether sulfone)s. The intrinsically high aromatic content of rigid-rod polyphenylenes imparts high thermal stability to poly(aryl ether sulfone)s evidenced by rigid-rod polyphenylenes' very high weight retention up to 500° C. accompanied by high char yield observed at 1000° C., and by their low heat release capacity characterizing these polyphenylenes as self-extinguishing materials. The presence of a continuous rigid-rod polyphenylene structure in the polymer blend consequently may serve as a protective layer and significantly reduce the heat release rate by acting as a thermal shield. This may be because additives that promote char formation have the advantages of reducing the mass of volatiles, creating thermal insulation, obstructing combustible gases, and increasing the thermal capacity of the material. These properties seal the material, preventing significant release of heat and smoke. Additionally, rigid-rod polyphenylenes do not release toxic chemicals when burned, other than minimal amounts of carbon monoxide. In addition, with a density of only 1.2 g/cm$^3$, rigid-rod polyphenylene resins are ideal for use in weight-sensitive aerospace applications.

Blends of the invention may also be used in foam applications. A foam is a two phase system comprised of solid material interspersed with a gaseous phase. Often, the solid material is a thermoplastic with entrapped air and the foam has typically been used for applications where its superior insulative and protective properties could be fully utilized (e.g., thermal insulation, packaging, protective cladding, etc.). Structural foams are a sub-class of polymeric foams and are primarily designed for load bearing applications where low weight is of the utmost importance. In addition to the weight savings, polymeric foams will not contribute to galvanic corrosion and can be installed and replaced in a cost efficient manner.

Composite sandwich structures comprising a foam are often employed due to their high specific strength. A structural sandwich is a special form of a laminated composite comprising a combination of different materials that are bonded to each other so as to utilize the properties of each separate component to the structural advantage of the whole. Typically, a sandwich composite consists of the following three main parts: two thin, stiff and strong faces separated by a thick, light and weaker core. The faces are adhesively bonded to the core (typically either a honeycomb material or a polymeric foam) to obtain a load transfer pathway between the components. In a traditional sandwich the vast majority of the rigidity and strength is derived from the relatively thin outside laminate skins. The core serves mainly as a spacer that transfers shear forces between the skin layers while stabilizing the skins at a constant distance and providing damage tolerance by absorbing impact energy.

Foam core materials are increasingly finding favor with materials engineers over more traditional honeycomb material. Due to the diversion of the shockwaves by their cellular structure, foams are more damage tolerant than honeycombs. Honeycombs achieve high compressive strength perpendicular to the panel, but their anisotropy is undesirable for hydrostatic loads for which foams are ideal. It is difficult to achieve sufficient peel strength with honeycombs due to their small contact surface while foams tend to have very high amounts of contact surface area. Finally, most foam cores offer good insulation behavior, while honeycombs have very limited capabilities.

While many thermoplastic foam core materials are of sufficiently low density, in general they possess lower strength-to-weight ratios than honeycomb materials. Additionally, many state-of-the-art polymeric foams are hydrophilic which can cause composite problems with core/surface skin delaminating under the influence of moisture, along with adding additional expensive pre-drying procedures. Therefore, it would be a significant improvement in the art if one could produce low-density, high-strength structural foam from a hydrophobic thermoplastic material or blend having a high use temperature.

The mechanical properties of structural foams are dependent upon both the inherent properties of the polymeric components and the cell structure (open or closed cells, cell size, density and uniformity) of the foam. Since the specific mechanical properties of rigid-rod polyphenylenes are typically 2-5 times higher than those of competing resins, rigid-rod polyphenylene-based foam cores are expected to exhibit superior mechanical properties to current organic foam materials. In addition, rigid-rod polyphenylenes are inherently hydrophobic and maintain good mechanical properties at elevated temperatures.

Chemical foaming results from the formation of a gas through the breakdown of special chemicals called foaming agents or blowing agents. Usually triggered by heat, the breakdown of a chemical foaming agent yields large amounts of gases. The polymer melt strength must be sufficiently low to allow gaseous bubbles to grow but not so low that the gases escape to the surface. Since the nature of the blowing agent determines the foaming temperature, plasticizers are often required to modify the melt rheological properties of the resin. Plasticizers improve the processibility of the resin, but negatively impact both the operating temperature of the foam as well as its mechanical properties.

Initial work utilizing chemical blowing agents produced polyphenylene foam exhibiting moderate density (near 12 pounds per cubic foot (pcf)) while maintaining specific shear strength (60 psi/pcf) and modulus (70 kilo-psi) comparable to those of expensive high-performance foams used in aerospace applications such as ROHACELL® WF (polymethacrylimide-hard foam). At higher densities (greater than 20 pcf), the properties of the polyphenylene foam far surpassed any commercially available foam; however, the desired high strength-to-weight ratio is best achieved by a lightweight foam. In order to eliminate the potentially detrimental influences of the foaming additives, the use of supercritical gases such as nitrogen and carbon dioxide was employed, which produces microcellular materials according to the pressure induced phase separation principle. This process produces pure, chemically inert foam without blowing agent residues and with a uniform cell structure and regular cell walls.

Structural foams composed solely of either polyphenylsulfone or rigid-rod polyphenylene were typically characterized by high densities (greater than 20 lbs/ft$^3$) when foamed using a supercritical gas process. Surprisingly, blending a small percentage of rigid-rod polyphenylene into a poly(aryl ether sulfone) resin was found to significantly lower overall bulk foam densities. A dramatic drop in bulk foam density of approximately 4-5 times was observed when a small amount of rigid-rod polyphenylene was incorporated into a polyphenylsulfone matrix, such as RADEL® R polyphenylsulfone. This unexpected result is desirable for foam applications.

This surprising discovery allows for the production of low-density polymeric foam by blending poly(aryl ether sulfone) and rigid-rod polyphenylene. The resulting foamed material possesses good mechanical properties, particularly including high specific shear strengths. Additionally, the base resins are hydrophobic. Therefore, the blended thermoplastic foam does not require expensive pre-drying steps that are currently used for the installation of hydrophilic foamed materials such as ROHACELL® polymethacrylimide-hard foam.

While foaming is a very dynamic process that incorporates many variables, it is apparent that rigid-rod polyphenylene in the blend plays a role in increasing the degree of bulk foam expansion. Without limiting the invention by any theory of operation one possible rationale that might explain this phenomenon is the difference in melt viscosities between the two polymers. At shear rates experienced during foaming, polyphenylsulfone is much less viscous in the melt phase when compared to rigid-rod polyphenylene resin. For the 100% polyphenylsulfone samples, this lower melt viscosity translates to poor melt strength hindering expansion by decreasing cell wall strength and increasing the potential for cell ripening and coalescence. The resulting foam has a moderately high final bulk foam density. For 100% rigid-rod polyphenylene samples, the high melt viscosity of the polyphenylene translates to high melt strength hindering expansion by resisting the expanding gas pressures. However, blends of polyphenylsulfone and polyphenylene exhibit a surprisingly improved performance in foam properties.

Although the invention is not limited by any theory of operation, it appears that cell wall strength plays a crucial role during the dynamic foaming process. Low concentrations (less than 15 wt. %) of rigid-rod polyphenylene in the blends contribute enough stiffness to the blends to allow for proper expansion without concern for excessive coalescence. As the concentrations of rigid-rod polyphenylene increase, the high melt strength of the rigid-rod polyphenylene resin begins to predominate, resulting in higher bulk foam densities.

The relative amounts of polyphenylene and poly(aryl ether sulfone) in a blend composition comprising said components are in a wt./wt. ratio range sufficient to decrease the foam density of said blend composition compared to the foam density of a similarly prepared sample comprising poly(aryl ether sulfone) and not polyphenylene. In particular embodiments foam samples are prepared as described in Baldwin, D., et al., Polymer Engineering and Science, vol. 36 (11), pp. 1437-1445 (1996), which is incorporated herein by reference. No lower limit of the amount of polyphenylene is implied provided the foam density in a blend is lowered as described. In a particular embodiment the relative amounts of polyphenylene and poly(aryl ether sulfone) for foam applications are in a wt./wt. ratio range of between about 0.1:99.9 to about 15:85, or in a wt./wt. ratio range of between about 1:99 to about 10:90. In many embodiments amounts of polyphenylene less than about 10 wt. %, less than about 5 wt. %, or even less that about 0.5 wt. % may have sufficient effect on desired physical properties in blends with poly(aryl ether sulfone). Alternatively, the presence of correspondingly small amounts by wt. of poly(aryl ether sulfone) may have beneficial effects on desired physical properties in blends with polyphenylene, such as, but not limited to, flow properties.

In still other embodiments the invention is related to a method for increasing the Tg of a composition comprising at least one rigid-rod polyphenylene by blending with a poly (aryl ether sulfone). The relative amounts of polyphenylene and poly(aryl ether sulfone) in such a blend composition comprising said components are in a wt./wt. ratio range sufficient to increase the Tg of said blend composition compared to Tg of a similarly prepared sample comprising polyphenylene and not poly(aryl ether sulfone). In particular embodiments the wt./wt. ratio of polyphenylene to poly(aryl ether sulfone) is in a range of between about 99.9:0.1 and 60:40, preferably in a range of between about 99.5:0.5 and 70:30, and more preferably in a range of between about 99:1 and 75:25.

Blends of the invention may be made by processing techniques which provide intimate mixing of blend components. In particular embodiments blends of the invention may be made by solution blending. Solution blending is typically done by dissolving the polymeric components in a mutual solvent or "co-solvent". Non-limiting examples of possible co-solvents for polyphenylenes and poly(aryl ether sulfone)s (depending upon such factors as concentration, polymer molecular weight, and temperature, and similar factors) comprise N-methylpyrrolidinone, methylene chloride, dimethylformamide, dimethyl acetamide, or the like, or mixtures thereof. In other particular embodiments blends of the invention may be made by standard techniques used to process polyphenylene or to process poly(aryl ether sulfone). Illustrative processing techniques in addition to those listed elsewhere herein, include, but are not limited to, at least one step of extrusion, kneading, profile extrusion, sheet extrusion, coextrusion, molding, injection molding, or physical mixing followed by compression molding, or combinations thereof, including combinations with a solution blending step. In a particular embodiment blends of the invention may be made by preparing a master mixture by intimately mixing a blend comprising polyphenylene and poly(aryl ether sulfone) in a wt./wt. ratio in a range of between 10:90 and 90:10, and (b) preparing a final blend comprising less than 10 wt. % polyphenylene by diluting the master mixture with poly(aryl ether sulfone) and intimately mixing in at least one additional process step, or preparing a final blend comprising less than 10 wt. % poly(aryl ether sulfone) by diluting the master mixture with polyphenylene and intimately mixing in at least one additional process step. In another particular embodiment blends of the invention may be made by (a) preparing a master mixture by intimately mixing a blend comprising polyphenylene and poly(aryl ether sulfone) in a 50:50 wt./wt. ratio and (b) preparing a final blend comprising less than 50 wt. % polyphenylene by diluting the master mixture with poly(aryl ether sulfone) and intimately mixing in at least one additional process step, or preparing a final blend comprising less than 50 wt. % poly(aryl ether sulfone) by diluting the master mixture with polyphenylene and intimately mixing in at least one additional process step. In still another embodiment step (b) may be performed in a single extrusion step by throat feeding of the master mixture components and downstream feeding of additional poly(aryl ether sulfone).

Embodiment (E)

In a certain embodiment (E), the invented blend composition comprises a blend of a rigid-rod polyphenylene polymer or copolymer with a polyphenylsulfone. Examples of suitable rigid-rod polyphenylene polymers and copolymers are described by Marrocco et al. in U.S. Pat. Nos. 5,227,457; 5,539,048; 5,565,543; 5,646,231; 5,654,392; 5,659,005; 5,668,245; 5,670,564; 5,721,335; 5,756,581; 5,760,131; 5,824,744; 5,827,927; 5,869,592; 5,886,130; and 6,087,467, all incorporated herein by reference; certain of such rigid-rod polyphenylene materials are commercially available under the trademark PARMAX®. Polyphenylsulfones are notably commercially available from SOLVAY ADVANCED POLYMERS, L.L.C. under the Trademark RADEL® (Series R). According to embodiment (E), non-limiting examples of amounts of rigid-rod polyphenylene (co)polymer are about 50% by weight, more preferably about 25%, even more preferably about 15%, yet more preferably about 10%, even more preferably about 5%; yet, according to said embodiment, amounts less than 2.5%, less than 1%, or even less than 0.1% may sometimes be useful. Thus, according to embodiment (E), blends with iterative amounts of rigid-rod polyphenylene (co)polymer varying from 0.1% by weight to 25% by weight are prepared using a known blending method such as heated extrusion. According to embodiment (E), the blend composition may be a pure polymer blend, or it may also contain any combination of additives, modifiers, and the like.

The following examples are included to provide additional guidance to those skilled in the art in practicing the claimed invention. The examples provided are merely representative of the work that contributes to the teaching of the application. Accordingly, these examples are not intended to limit the invention, as defined in the appended claims, in any manner.

In the following examples "polyphenylene 1" was PARMAX® 1200, a rigid-rod polyphenylene copolymer, and "polyphenylene 2" was PARMAX® X1500, another rigid-rod polyphenylene copolymer, both available from Mississippi Polymer Technologies, Bay St. Louis, Miss. Poly(aryl ether sulfone) was RADEL® R having the structure of formula (VI) available from Solvay Advanced Polymers, Alpharetta, Ga. Glass transition temperatures (Tg) were determined by differential scanning calorimetry (DSC) under nitrogen. In most cases a first heat scan was run at 20° C./minute, followed by slow cooling, and a second heat scan was run at 10° C./minute to determine Tg. Theoretical glass transition temperatures were calculated using both the Fox equation and also the Utraki-Jukes equation as described, for example, in "Polymer Physics" by Ulf W. Gedde, Kluwer Academic Publishers, Dordrecht, Netherlands; 1999; pp. 70-73. Izod impact strength values were determined according to ASTM D256. Tensile properties were determined according to ASTM D638. Flexural properties were determined according to ASTM D790.

EXAMPLE 1

A blend comprising 80% by weight of polyphenylene 1 and 20% by weight of RADEL® R polyphenylsulfone was melt-mixed using a 1 inch diameter Killion single screw extruder having a mixing section at a melt temperature of 330° C. The resulting polymer blend was analyzed by DSC. A major glass transition was detected having a midpoint temperature of 160.5° C., and a very minor glass transition was detected at approximately 208° C. The individual Tg's of polyphenylene 1 and RADEL® R polyphenylsulfone are 158° C. and 220° C., respectively. Thus, if miscible, the theoretical Tg of the 80:20 blend has a calculated value of 169° C. That the experimentally observed major glass transition did not occur at the theoretical Tg indicates incomplete miscibility between the two polymers at this particular ratio of components. The observed Tg, however, was higher than that of the major component (polyphenylene 1), suggesting that some degree of miscibility was present.

EXAMPLE 2

A blend comprising 90% by weight of polyphenylene 1 and 10% by weight of RADEL® R polyphenylsulfone was melt-mixed using a 1 inch diameter Killion single screw extruder having a mixing section at a melt temperature of 330° C. The resulting polymer blend was analyzed by DSC. A major glass transition was detected having a midpoint temperature of 163° C. The individual Tg's of polyphenylene 1 and RADEL® R polyphenylsulfone are 158° C. and 220° C., respectively. According to either the Fox equation or the Utraki-Jukes equation, the theoretical Tg of this polymer blend, assuming full miscibility, has a calculated value of 163.5° C. That the experimentally observed Tg did occur at the theoretical Tg indicates good miscibility between the two polymers at the given proportion (90:10).

EXAMPLES 3-6 AND COMPARATIVE EXAMPLES 1-2

Individual compositions comprising various proportions by weight of polyphenylene 1 and RADEL® R polyphenylsulfone were melt-mixed using a 1 inch diameter Killion single screw extruder having a mixing section at a melt temperature of 330° C. The resulting blends were analyzed by DSC, and standard physical properties were also determined. The properties are shown in Table 1. Physical properties for RADEL® R polyphenylsulfone and polyphenylene 1 are also shown as Comparative Examples (abbreviated "C.Ex.") 1 and 2, respectively. The observed shifts in Tg values suggest that some degree of miscibility between polyphenylene 1 and RADEL® R polyphenylsulfone was present.

TABLE 1

| | Example or Comparative Example | | | | | |
|---|---|---|---|---|---|---|
| | C. Ex. 1 | Ex. 3 | Ex. 4 | Ex. 5 | Ex. 6 | C. Ex. 2 |
| RADEL ®/ polyphenylene | 100/0 | 90/10 | 80/20 | 70/30 | 60/40 | 0/100 |
| Elong. at break (%) | NB | NB | NB | 9.0 | 11 | 8.0 |
| Flexural strength (psi) | 16700 | 15900 | 19500 | 21400 | 24300 | 47300 |
| Flexural modulus (Kpsi) | 300 | 390 | 440 | 500 | 570 | 1180 |
| Notched Izod impact strength (ft-lb/inch) | 14.4 | 5.4 | 2.8 | 1.8 | 1.4 | 0.8 |
| Unnotched Izod impact strength (ft-lb/inch) | NB | NB | 45.9 | 32.9 | 19.8 | 8.3 |
| Tg 1 (° C.) | 221 | 219 | 217 | 216 | 216 | — |
| Tg 2 (° C.) | — | 162 | 164 | 163 | 163 | 158 |

EXAMPLE 7

A blend comprising 80% by weight of polyphenylene 2 and 20% by weight of RADEL® R polyphenylsulfone was melt-mixed using a 1 inch diameter Killion single screw extruder having a mixing section at a melt temperature of 330° C. The resulting polymer blend was analyzed by DSC. A major glass transition was detected having a midpoint temperature of 175° C. The individual Tg's of polyphenylene 2 and RADEL® R polyphenylsulfone are 165° C. and 220° C., respectively. According to either the Fox equation or the Utraki-Jukes equation, the theoretical Tg of this polymer blend, assuming full miscibility, has a calculated value of 175° C. That the experimentally observed Tg did occur at the theoretical Tg indicates very good miscibility between the two polymers at the given proportion (80:20).

EXAMPLE 8

A blend comprising 75% by weight of polyphenylene 2 and 25% by weight of RADEL® R polyphenylsulfone was melt-mixed using a 1 inch diameter Killion single screw extruder having a mixing section at a melt temperature of 330° C. The resulting polymer blend was analyzed by DSC. A major glass transition was detected having a midpoint temperature of 174° C. The individual Tg's of polyphenylene 2 and RADEL® R polyphenylsulfone are 165° C. and 220° C., respectively. According to either the Fox equation or the Utraki-Jukes equation, the theoretical Tg of this polymer blend, assuming full miscibility, has a calculated value of 178° C. That the experimentally observed Tg did occur near the theoretical Tg indicates good miscibility between the two polymers at the given proportion (75:25).

Polymer pairs, in general, rarely demonstrate significant miscibility. It is surprising and unexpected that polyphenylene would exhibit any miscibility with poly(aryl ether sulfone), and particularly that polyphenylene 2 would exhibit essentially complete miscibility with poly(aryl ether sulfone) over a range of proportions. It is also surprising and unexpected that polyphenylene 2 would be more miscible with poly(aryl ether sulfone) than polyphenylene 1.

EXAMPLE 9

Blends of polyphenylene 1 with RADEL® R poly(aryl ether sulfone) were prepared by melt mixing the resins in a 1 inch diameter Killion single screw extruder having a mixing section at a melt temperature of 320° C. Individual blends were composed of polyphenylene 1 in 5 wt. % increments from 0 wt. % polyphenylene 1 to 25 wt. % polyphenylene 1. Each resulting mixture was pelletized and then reextruded under the same conditions to ensure complete mixture of the two polymers. Each blend was then compression molded in a 4 inch x 4 inch square mold at a temperature of 330° C. and 1000 psi for 30 minutes. The resulting plaques were then supercritically foamed as described in Baldwin, D., et al., Polymer Engineering and Science, vol. 36 (11), pp. 1437-1445 (1996). A pure RADEL® R sample processed and foamed in the same manner had 30 pcf bulk foam density. In contrast the bulk foam density of RADEL® R comprising 5 wt. % polyphenylene was approximately 6 pcf.

EXAMPLE 10

Blends of polyphenylene 1 with RADEL® R polyphenylsulfone were prepared by melt mixing and compression molding the compositions in the process detailed in Example 9. The plaques were foamed by a supercritical process and the resulting bulk foam densities are shown in Table 2.

TABLE 2

| Polyphenylene wt. % | Poly(aryl ether sulfone) wt. % | Density (pcf) |
|---|---|---|
| 4 | 96 | 7.3 |
| 6 | 94 | 7.1 |
| 8 | 92 | 9.3 |
| 10 | 90 | 10.4 |
| 12 | 88 | 10.8 |

A foam density of 7 pcf was achieved at a polyphenylene 1 concentration of 6 wt. %. This result suggests that the optimal polyphenylene 1 concentration is approximately 6 wt. % if the desired result is producing the lowest possible foam density. At higher polyphenylene 1 concentrations, the bulk foam density gradually increases.

While the 6% polyphenylene 1 blend displayed the lowest foam density, it should be noted that the densities of many the blended foams were low. This result is significant because it provides a range of concentrations to optimize the foam properties for any targeted application. For example, higher modulus foam might be required for applications needing relatively low density, i.e., stiff foam. From a qualitative inspection of the foam, it was observed that the foams of blends containing higher concentration polyphenylene 1 were noticeably stiffer than the foams of blends containing lower concentration polyphenylene 1. It is surprising and unexpected that addition of polyphenylene to poly(aryl ether sulfone) would result in such a drastic decrease in foam density.

EXAMPLE 11 AND COMPARATIVE EXAMPLES 3-4

A 50/50 weight percent mixture of RADEL® R pellets and polyphenylene 2 pellets is mixed and added to a single-screw Killion extruder at 290° C. with a 3 millimeter cylindrical hole dye. The resulting blend pellets are used as a master mixture for the following compositions:

A blend comprising 25% polyphenylene 2 is prepared by mixing an appropriate proportion of the 50/50 master mixture with an appropriate proportion of RADEL® R pellets and extruding the mixture. The pellets of this blend are injection molded into plaques of appropriate sizes for OSU (Ohio State University) testing of heat and visible smoke release property determination.

A blend comprising 50% polyphenylene 2 is prepared by conducting an extrusion and pelletization of the 50/50 master mixture with an appropriate proportion of RADEL® R pellets. The pellets of this blend are injection molded into plaques of appropriate sizes for OSU testing of heat and visible smoke release property determination.

A blend comprising 75% polyphenylene 2 is prepared by mixing an appropriate proportion of RADEL® R pellets with the 50/50 master mixture and extruding the mixture. The pellets of the blend are injection molded into plaques of appropriate sizes for OSU testing of heat and visible smoke release property determination.

In addition to the blends evaluated for OSU testing of heat and visible smoke release property determination, neat resins of both RADEL® R and polyphenylene 2 are injection molded into plaques of appropriate sizes and tested as a reference for degree of property improvement. Certain of the blends comprising RADEL® R as the majority component show improved (i.e. decreased) values for heat and visible smoke release compared to the RADEL® R comparative sample not containing polyphenylene. In particular, transparent blends of RADEL® R and polyphenylene 2 release substantially less heat and visible smoke than standard RADEL® R resins.

EXAMPLE 12 AND COMPARATIVE EXAMPLE 5

Blends are prepared comprising 0.5-25 wt. % of polyphenylene 2 and the remainder being RADEL® R. The pellets of this blend are injection molded into plaques of appropriate sizes for OSU testing of heat and visible smoke release property determination. The blends exhibit a improved flame resistance and/or improved heat and smoke release properties compared to similar properties measured for RADEL® R alone as measured using standard UL and/or OSU protocols.

EXAMPLE 13 AND COMPARATIVE EXAMPLE 6

Blends are prepared comprising 0.5-25 wt. % of a 50:50 mixture of polyphenylene 1 and polyphenylene 2 and the remainder being RADEL® R. The pellets of this blend are injection molded into plaques of appropriate sizes for OSU testing of heat and visible smoke release property determination. The blends exhibit a improved flame resistance and/or improved heat and smoke release properties compared to similar properties for RADEL® R alone as measured using standard UL and/or OSU protocols.

EXAMPLE 14

In the following example a polyphenylene homopolymer comprising structural units derived from p-dichlorobenzophenone with no m-dichlorobenzene is employed. A blend comprising 80% by weight of polyphenylene homopolymer and 20% by weight of RADEL® R polyphenylsulfone is melt-mixed using a 1 inch diameter Killion single screw extruder having a mixing section at a melt temperature of about 330° C. The resulting polymer blend is analyzed by DSC. The blend composition has a higher Tg that that of the polyphenylene homopolymer alone.

EXAMPLE 15

In the following example a polyphenylene homopolymer comprising structural units derived from p-dichlorobenzophenone with no m-dichlorobenzene is employed. A blend comprising 20% by weight of RADEL® R polyphenylsulfone and 80% by weight of a polyphenylene mixture consisting of 50:50 polyphenylene homopolymer and at least one polyphenylene copolymer having structural units derived both p-dichlorobenzophenone and m-dichlorobenzene is melt-mixed using a 1 inch diameter Killion single screw extruder having a mixing section at a melt temperature of about 330° C. The resulting polymer blend is analyzed by DSC. The blend composition has a higher Tg that that of the polyphenylene mixture alone.

The present application incorporates by reference the whole content of U.S. patent application Ser. No. 11/074,616 entitled "Ammunition Casing". The invention of the present application has been described with reference to preferred and exemplary embodiments but is not limited thereto. Those skilled in the art will appreciate that various modifications can be made without departing from the scope of the invention, which is defined by the following claims.

The invention claimed is:

1. A foam comprising a blend of a polyphenylene and a poly(aryl ether sulfone), wherein the polyphenylene is a polyphenylene copolymer consisting of structural units derived from 60-95 mole % p-dichlorobenzophenone and 40-5 mole % m-dichlorobenzene and the poly(aryl ether sulfone) consists of structural units of formula

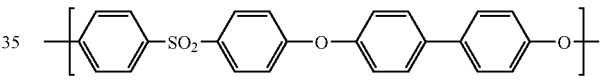

wherein the wt./wt. ratio of the polyphenylene to the poly(aryl ether sulfone) is 5:95-20:80.

* * * * *